(12) United States Patent
Gill, III et al.

(10) Patent No.: US 9,403,594 B2
(45) Date of Patent: Aug. 2, 2016

(54) ADJUSTABLE PAYLOAD ENCLOSURE FOR WING

(71) Applicants: Frank Joseph Gill, III, Conshohocken, PA (US); Matthew Howard Cawthorne, Wayne, PA (US); Christopher James Cline, Glen Mills, PA (US); Dinesh Panneerselvam, Thorndale, PA (US); Russell Eddy Fay, Newark, DE (US)

(72) Inventors: Frank Joseph Gill, III, Conshohocken, PA (US); Matthew Howard Cawthorne, Wayne, PA (US); Christopher James Cline, Glen Mills, PA (US); Dinesh Panneerselvam, Thorndale, PA (US); Russell Eddy Fay, Newark, DE (US)

(73) Assignee: The Boeing Company, Chicago, IL (US)

( * ) Notice: Subject to any disclaimer, the term of this patent is extended or adjusted under 35 U.S.C. 154(b) by 1181 days.

(21) Appl. No.: 13/625,959

(22) Filed: Sep. 25, 2012

(65) Prior Publication Data
US 2014/0086750 A1 Mar. 27, 2014

(51) Int. Cl.
*B64D 9/00* (2006.01)
*B29C 65/00* (2006.01)
*B23P 15/04* (2006.01)
*B64C 27/473* (2006.01)
*B64C 27/00* (2006.01)

(52) U.S. Cl.
CPC . *B64D 9/00* (2013.01); *B23P 15/04* (2013.01); *B29C 65/002* (2013.01); *B64C 27/008* (2013.01); *B64C 27/473* (2013.01); *Y10T 29/49337* (2015.01)

(58) Field of Classification Search
CPC ..................................................... B64C 27/008
USPC .................................................... 416/144, 145
See application file for complete search history.

(56) References Cited

U.S. PATENT DOCUMENTS

| 6,139,271 | A | 10/2000 | Chadwick |
| 7,097,427 | B2 | 8/2006 | Kuhns |
| 7,118,343 | B2 | 10/2006 | Loftus |
| 8,029,240 | B2 | 10/2011 | Cawthorne et al. |

FOREIGN PATENT DOCUMENTS

| DE | 4005896 A1 * | 8/1991 | ............ B64C 27/008 |
| WO | 9413530 | 6/1994 | |

* cited by examiner

*Primary Examiner* — Richard Edgar
(74) *Attorney, Agent, or Firm* — Ostrager Chong Flaherty & Broitman P.C.

(57) ABSTRACT

An enclosure for carrying an adjustable payload. The enclosure is beneficially used on a rotorcraft blade or other similar structure. The enclosure has a first element having a first flange and an upper element. The first element has an upper surface which has a first angle with respect to a lower surface of the first flange in a direction extending from an inboard direction to an outboard direction. The upper element has a lower surface which has a second angle with respect to an upper surface of said upper element in a direction extending from an inboard direction to an outboard direction, the lower surface being in contact with the upper surface of said first element, the second angle being in a direction which is opposite to the direction of said first angle. The first element and the upper element define a cavity for holding a payload.

25 Claims, 8 Drawing Sheets

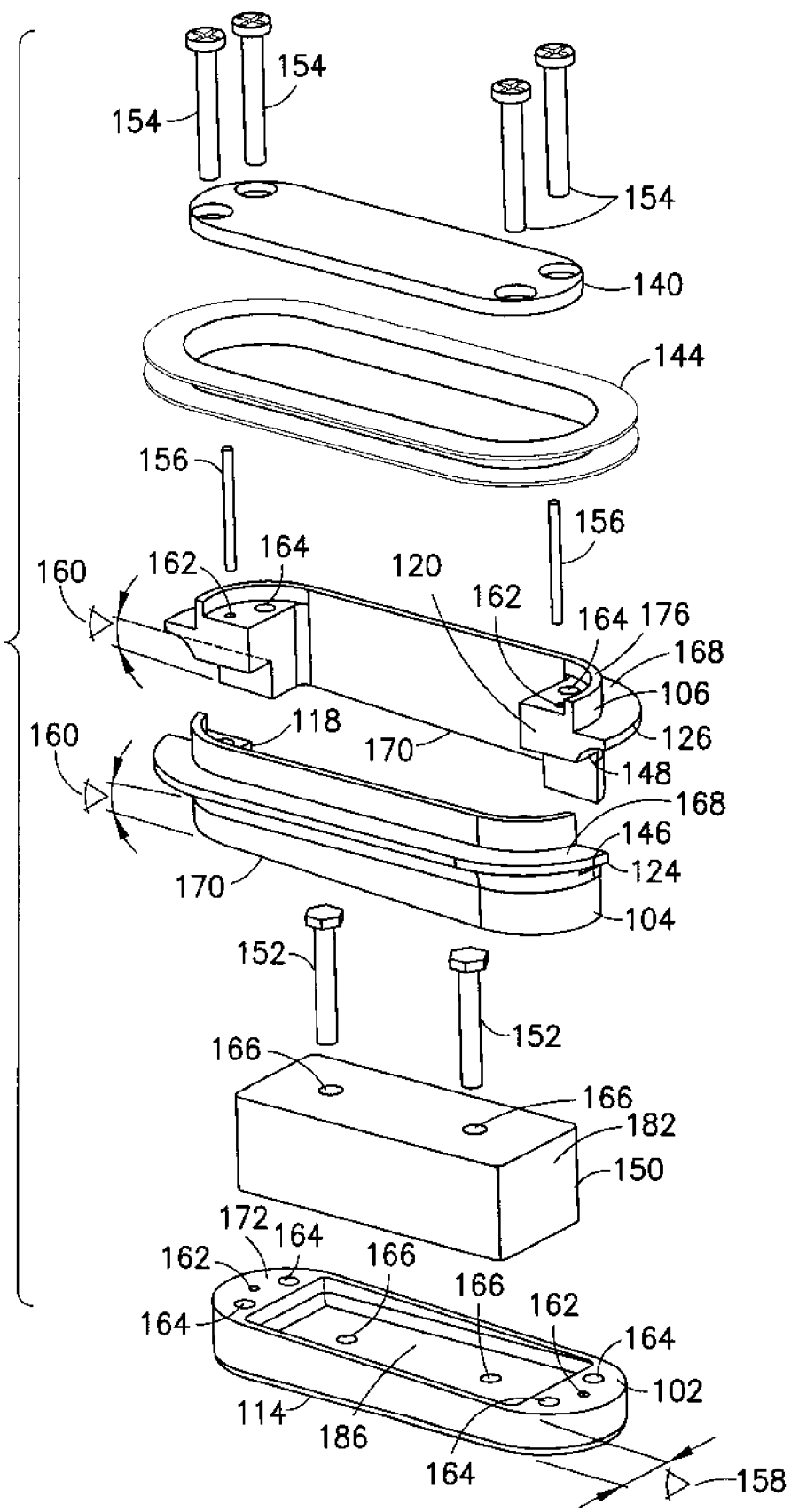

ADJUSTABLE PAYLOAD ENCLOSURE FOR WING

STATEMENT REGARDING FEDERALLY SPONSORED RESEARCH OR DEVELOPMENT

This invention was made with Government support under Contract No. W58RGZ-04-G-0023 awarded by the US Army Aviation & Missile Command. The Government has certain rights in this invention.

TECHNICAL FIELD

This disclosure relates generally to enclosures for wings, and more specifically to an adjustable payload enclosure which will remain in place in the interior of a wing without being bonded or bolted.

BACKGROUND

It is often a requirement to include payloads, such as weighting or instrumentation devices within the interior of a wing. Such payloads are typically carried within enclosures that are installed in the interior of a wing. For example, in rotorcraft, ballast weights may be installed in an enclosure which is placed inside the interior of a rotor blade, in order to balance the blade.

Typically, such enclosures are held in place using fasteners, adhesive bondlines, or through other means of coupling such enclosures to the interior of the wing. Due to the various stresses during flight, fatigue can be induced in the bondlines or fastener threads. Reduction of these stresses or elimination of parts that fatigue are a benefit to an air vehicle's lifecycle and safety.

In a rotorcraft, having the enclosures near the tip and as far from the pitch axis as possible allows for maximum effect on inboard and outboard static balancing as well as fore and aft dynamic balancing. Unfortunately, advanced composite rotor blades often use complicated tip designs including anhedral, dihedral, sweep and taper to increase aerodynamic performance, therefore sizing enclosures within these features may be difficult. In addition, due to loads environments that cause bending and twisting of the blade during flight, simply moving the enclosures inboard may expose the bondlines and or fasteners to increasingly higher bending stresses; therefore sizing the bondlines and fasteners may be more difficult.

Several attempts have been made in the past to solve the issue of how to locate an enclosure within the interior of a rotorblade. While these attempts may have their advantages in some situations, they may not be advantageous in others. One such attempt includes moving enclosures further inboard on the rotor blade. However, moving the adjustable weight enclosures inboard and away from the rotor blade tips may lead to other difficulties, such as issues related to cutting an access panel through a load bearing structure and issues related to bonding or bolting a stiffer enclosure to a more flexible structure.

Another attempt includes the use of removable tips. However, these may be an expensive option and can increase the weight of the blade. Another attempt includes co-bonding an enclosure with a composite rotor blade. However, a co-bonded enclosure may restrict pressure application during cure which may affect laminate quality, may prohibit certain non-destructive inspection techniques and may make it more difficult to control the location.

Therefore, a solution is required for installing enclosures into the interior of a wing, while avoiding the difficulties associated with bonding or bolting a stiffer enclosure to a more flexible structure in wing locations which experience relatively high levels of mechanical stresses.

SUMMARY

Accordingly, an enclosure is provided herein which does not require bond lines or their associated manufacturing costs and inspection, and does not require threaded fasteners and their associated issues and costs. The shape of the enclosure allows the natural forces applied by the rotor during operation to trap the enclosure, and requires no bond lines or fasteners to keep the enclosure in place. Assembly of the enclosure is also relatively simple. The enclosure is inserted into an opening in a rotor blade and assembled in place within the rotor blade. The enclosure may be repeatedly installed and removed for inspection, replacement, repair or for other reasons. It should be understood that while this disclosure generally references this enclosure in the context of a rotorcraft blade, it may be used in other structures, such as fixed wing aircraft wings.

The enclosure comprises three or four main elements: an upper element, to be inserted into the opening, and to be in communication with an internal surface of the rotor blade, forward and aft elements to be inserted into the opening and to be in communication with the upper element, and a lower element to be coupled to the forward and aft elements and to enclose a cavity within the enclosure. The forward and aft elements have a flange for engagement with a peripheral edge of the opening in the rotor blade. The forward and aft elements may be combined or "unitized." The flange retains the enclosure within the rotor blade. The enclosure cannot fall out or separate once assembled. Parting angles are present within the enclosure, such that natural centrifugal forces applied to a rotorcraft blade during operation of the rotorcraft will serve to further wedge the parts of the enclosure together, thus permitting the enclosure to be held in place without requiring adhesive bonds or fasteners. These parting angles will be described in further detail below.

An enclosure is provided herein, comprising a first element having a first flange; and an upper element; said first element having an upper surface which has a first angle with respect to a lower surface of said first flange in a direction extending from an inboard direction to an outboard direction; said upper element having a lower surface which has a second angle with respect to an upper surface of said upper element in a direction extending from an inboard direction to an outboard direction, said lower surface being in contact with said upper surface of said first element, said second angle being in a direction which is opposite to the direction of said first angle; and said first element and said upper element defining a cavity.

A combination apparatus is also provided herein, comprising a rotor blade comprising an opening with a peripheral edge; an enclosure being inserted into said rotor blade, said enclosure comprising: a first element having a first flange; and an upper element comprising an upper surface mating with an interior surface of said rotor blade; said first element having an upper surface which has a first angle with respect to a lower surface of said first flange in a direction extending from an inboard direction to an outboard direction; said upper element having a lower surface which has a second angle with respect to an upper surface of said upper element in a direction extending from an inboard direction to an outboard direction, said lower surface being in contact with said upper surface of said first element, said second angle being in a direction which is opposite to the direction of said first angle; said first element and said upper element being in contact and defining a cavity; and said first flange being in engagement with the peripheral edge.

The first element may be a unitized forward and aft element having a peripheral flange.

Alternatively, there may additionally be a second element, and the first and second element may be aft and forward elements, respectively. The first and second elements may be aligned such that the first flange and a second flange on the second element are joined together to form a peripheral flange. The aft element and forward element may have upper surfaces which have a first angle with respect to a lower surface of the peripheral flange in a direction extending from an inboard direction to an outboard direction, and the lower surface of said upper element may be in contact with said upper surfaces of said aft element and said forward element.

A method for installing an apparatus into a cavity in a rotor blade is also provided, comprising the steps of: inserting, into said cavity, an upper element comprising an upper surface for mating with an interior surface of said rotor blade, and sliding said upper element in an inboard direction to a stowed position; inserting, into said cavity, a first element having a first flange; moving said first element such that said flange is in contact with a peripheral edge in an opening in said rotor blade; and retrieving said upper element from said stowed position by moving said upper element in an outboard direction, wherein an angled lower surface of said upper element contacts an angled upper surface of said first element, until a cavity is formed by the upper element, and the first element.

The method may further comprise inserting, into said cavity, a second element having a second flange, wherein said first element and said second elements are aft and forward elements; and moving said aft element and said forward element in a downward direction towards said opening until a peripheral edge of said opening is brought into contact with said first flange and said second flange, said first flange and said second flange together forming a peripheral flange. The method may also comprise the step of, prior to moving said aft element and said forward element in a downward direction, bringing said aft element and forward element together wherein said first flange and said second flange are aligned to form a peripheral flange.

The method may also comprise the steps of creating an alternate opening for insertion of said first element; wherein said first element is a unitized element; and wherein inserting, into said cavity, a first element having a first flange comprises inserting said unitized element through said alternate opening.

The method may also further comprise the step of curing, within said cavity, a unitized element having the shape of a combination of a forward element and an aft element to form said first element.

Other objects, features and advantages will be apparent when the detailed description of the preferred embodiments is considered in conjunction with the drawings.

BRIEF DESCRIPTION OF THE DRAWINGS

FIG. 5 is an illustration, in exploded view, of an enclosure.

Reference will now be made to the drawings, in which similar elements in different drawings bear the same reference numerals.

DETAILED DESCRIPTION OF THE DRAWINGS

The present disclosure relates to an enclosure which may be used within a rotor blade, for example, in a helicopter or other rotorcraft. Many specific details of certain embodiments of an enclosure are set forth in the following description and in FIGS. 1-9 to provide a thorough understanding of such embodiments. One skilled in the art, however, will understand that the present disclosure may have additional embodiments, or that embodiments of the present disclosure may be practiced without several of the details according to the following description. For instance, while certain embodiments reference usage on rotorcraft, it may be appreciated by those of skill in the art that the techniques described may be applied on a variety of vehicles or in other contexts as desired. Further, while reference may be made to use of the enclosure to contain weighting elements to tune a rotor blade, the enclosure need not be used to contain weighting elements, and may in fact be used to contain other objects such as sensing equipment.

Figure 1:
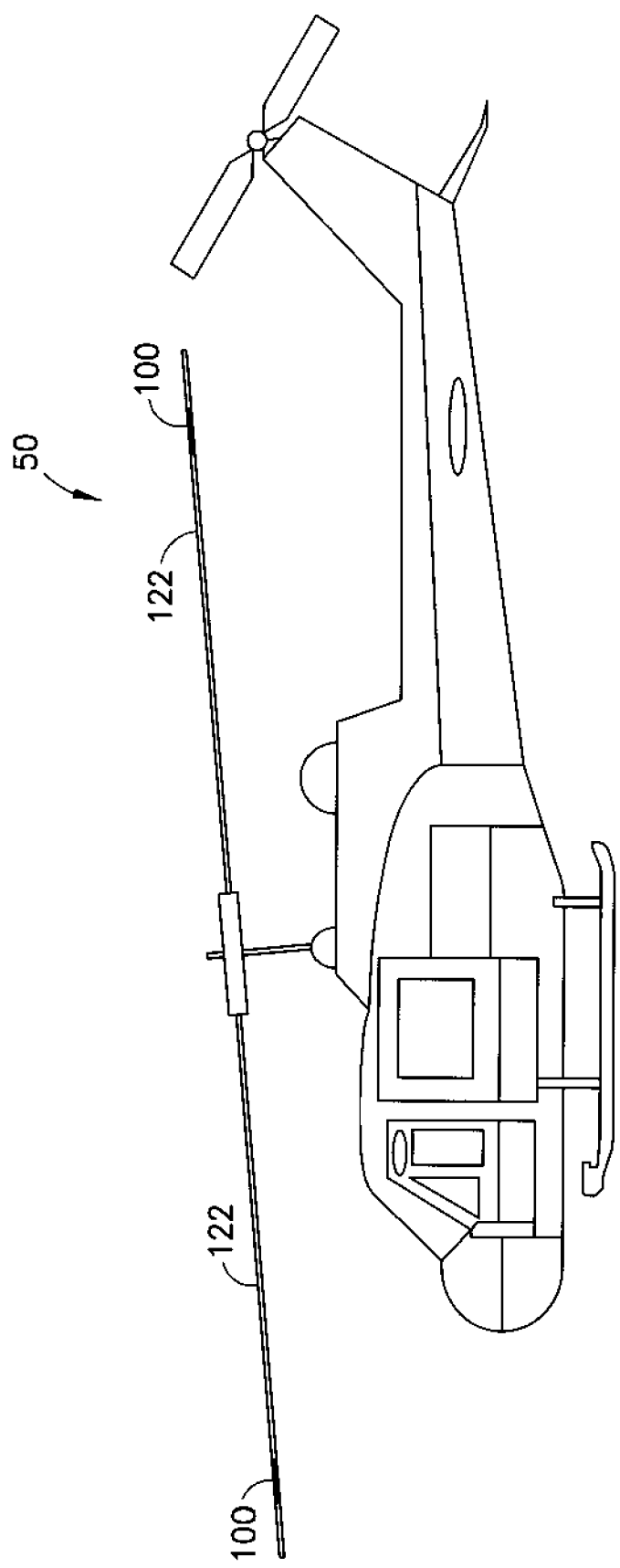
FIG. 1 is an illustration, in side view, of an exemplary rotorcraft employing the enclosure which is the subject of this disclosure.

FIG. 1 depicts a rotorcraft 50 with one main rotor having rotor blades 122. The location of an exemplary enclosure 100 is shown in the figure as being towards the tips of the rotor blade 122. The exemplary location for the enclosure 100 should not be taken as limiting. In other embodiments, the enclosure 100 can be placed in other locations and orientations as needed. Further, the enclosure 100 may be used in non-rotorcraft.

Figure 2:
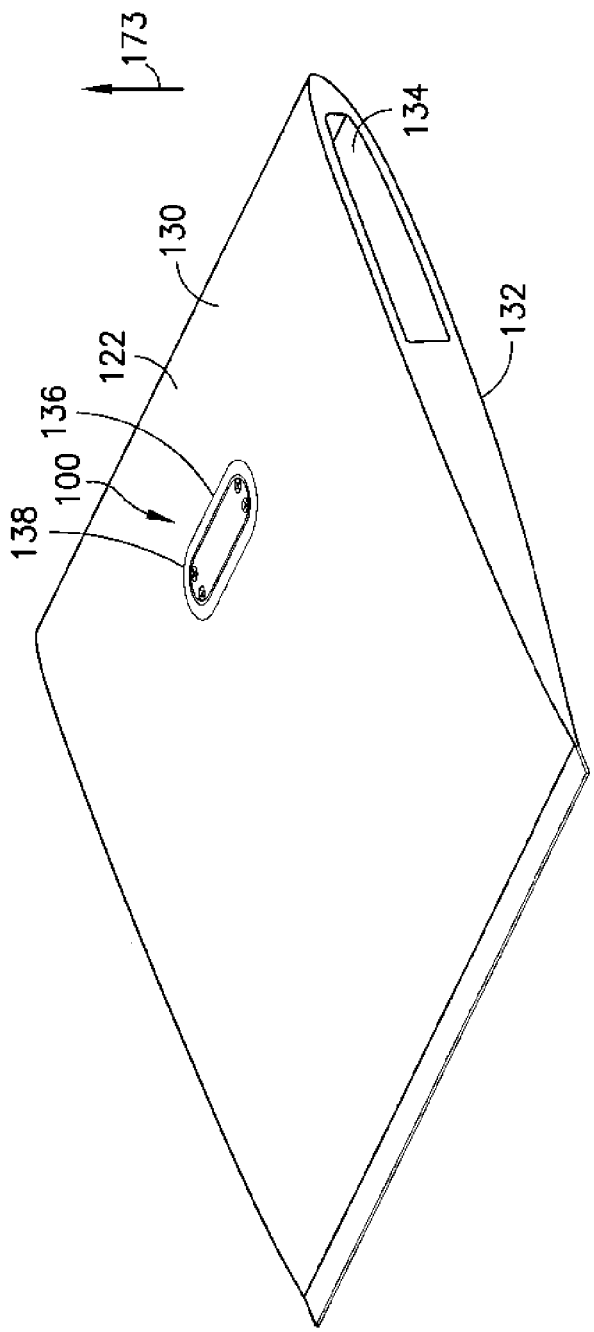
FIG. 2 is an illustration, in partial isometric view, of a rotor blade in which the enclosure is installed.
Figure 3:
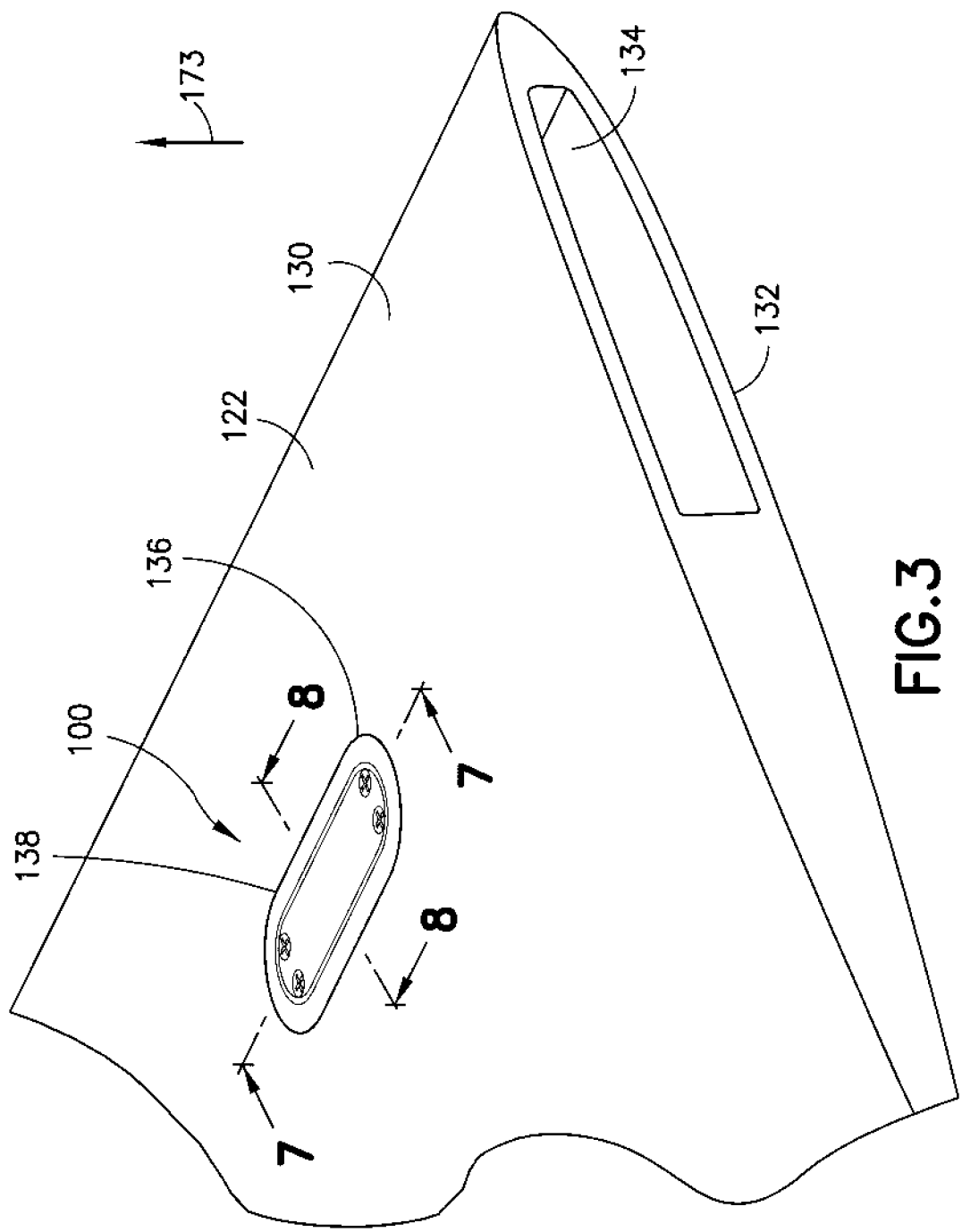
FIG. 3 is an illustration, in close-up isometric view, of a rotor blade in which the enclosure is installed.

FIG. 2 is a partial isometric view of a portion of the rotor blade 122 shown in FIG. 1, with an enclosure 100 displayed in an assembled configuration and installed into the rotor blade 122. FIG. 3 is a close-up partial view of the same rotor blade 122, also depicting cross-section lines for the cross-sectional views depicted in FIGS. 7 and 8. It should be noted that the view presented in FIGS. 2 and 3 are depicted with the bottom side 130 of the rotor blade 122 facing upwards and with the top side 132 of the rotor blade 122 facing downwards. Number 173 therefore points in the direction going from the top of the blade 122 to the bottom of the blade 122.

Figure 4:
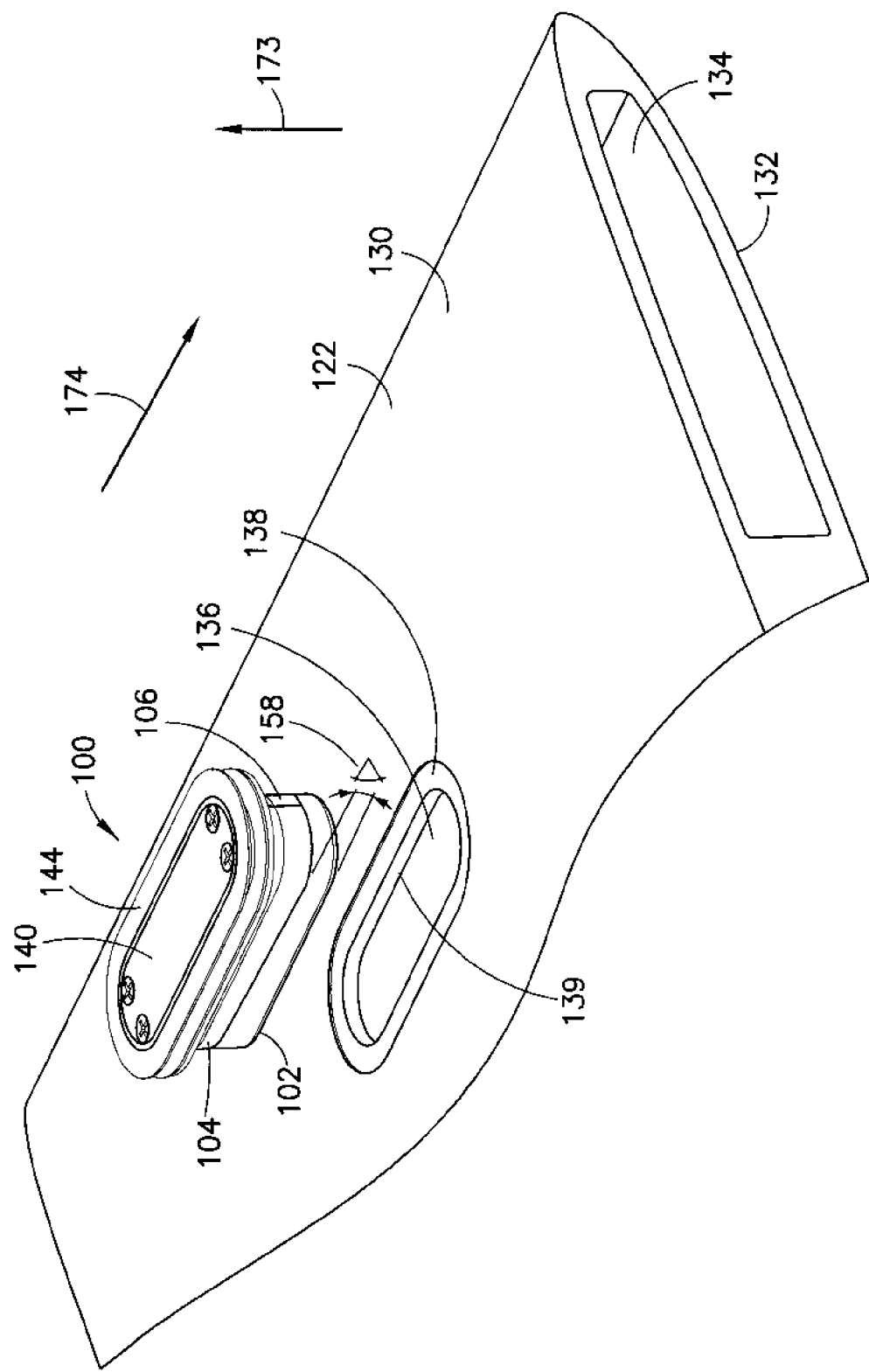
FIG. 4 is an illustration, in close-up isometric view, of a rotor blade, showing an assembled enclosure removed from the blade.

As can be seen, an internal rotor cavity 134 is shown. This cavity 134 may be within a spar structure which is typically found in rotor blades. An opening 136 with a peripheral edge 138 is cut out of the rotor blade 122. The peripheral edge 138 has a side surface 139 for contacting a peripheral flange 110 of the enclosure 100. The opening 136 may be in a primary structure such as a spar, or may be in another type of structure. The opening 136 is for accepting the enclosure 100, and the peripheral edge 138 is for retention of the enclosure 100, via the peripheral flange 110 of the enclosure 100, which will be discussed in more detail below. FIG. 4 is a close up view as in FIG. 3, but with enclosure 100 in an assembled configuration and removed from the opening 136. FIG. 4 depicts direction 174 which is the outboard direction.

Figure 6:
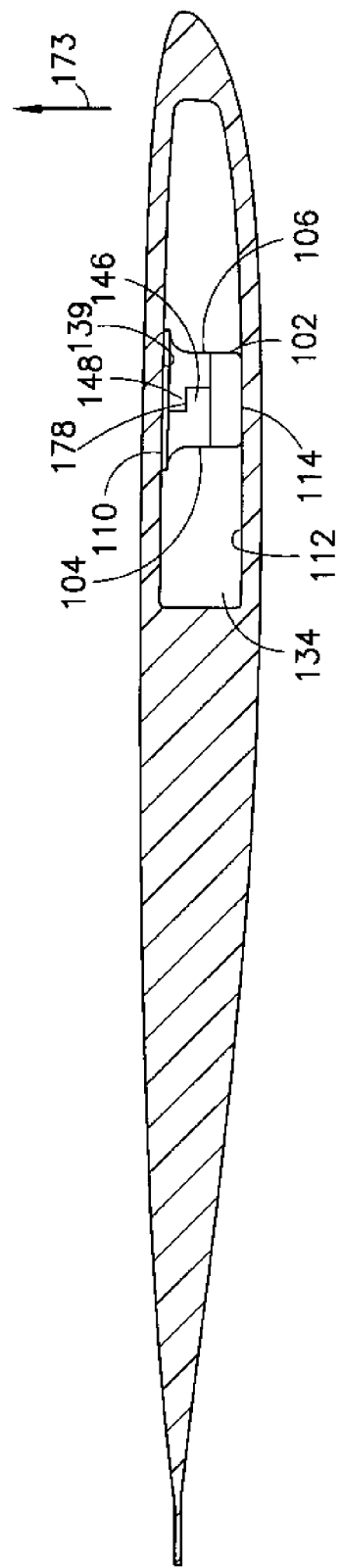
FIG. 6 is an illustration, in partial side view, of a rotor blade in which the enclosure is installed.
Figure 7:
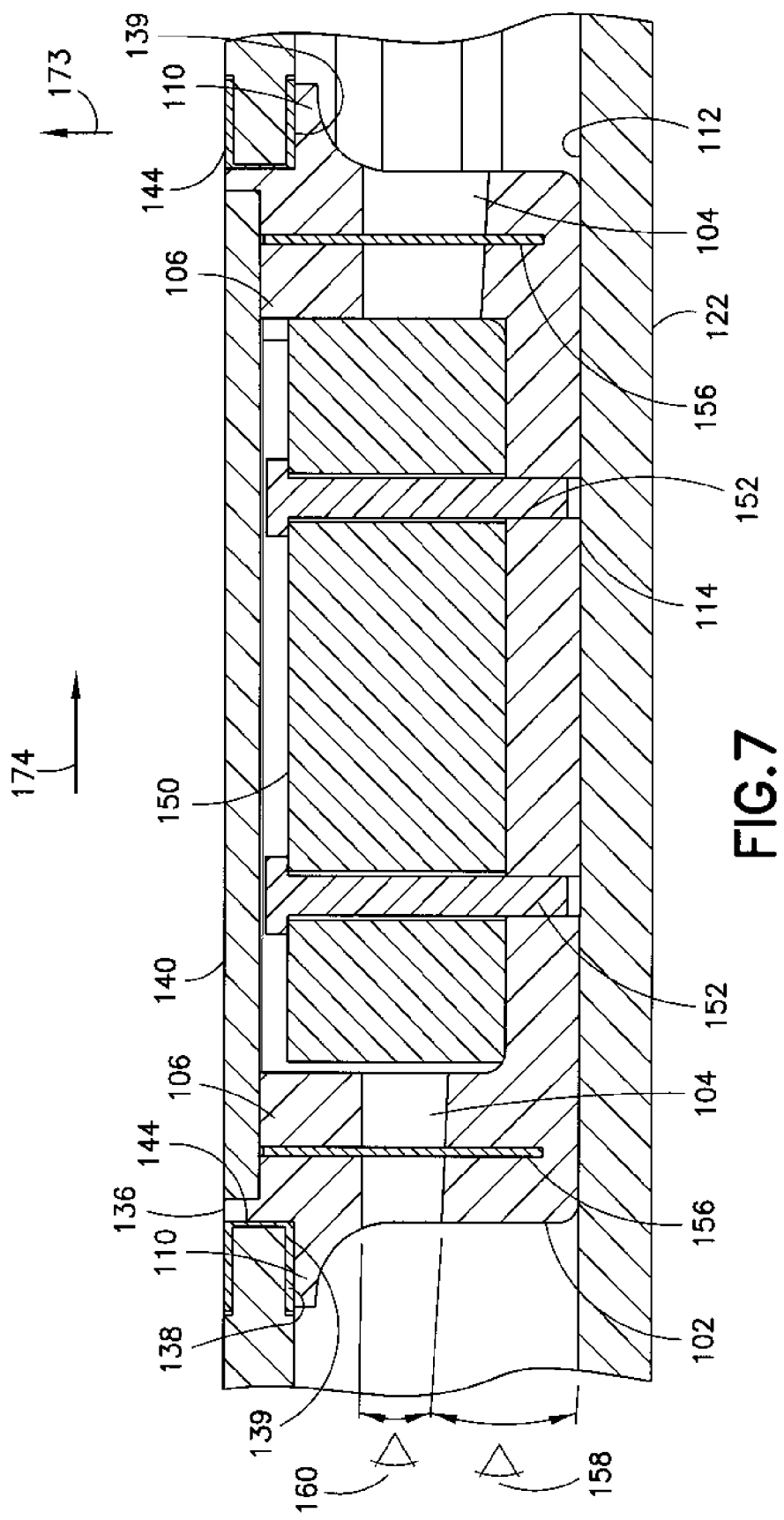
FIG. 7 is an illustration, in cross-sectional view taken along lines 7-7, of a rotor blade in which the enclosure is installed.
Figure 8:
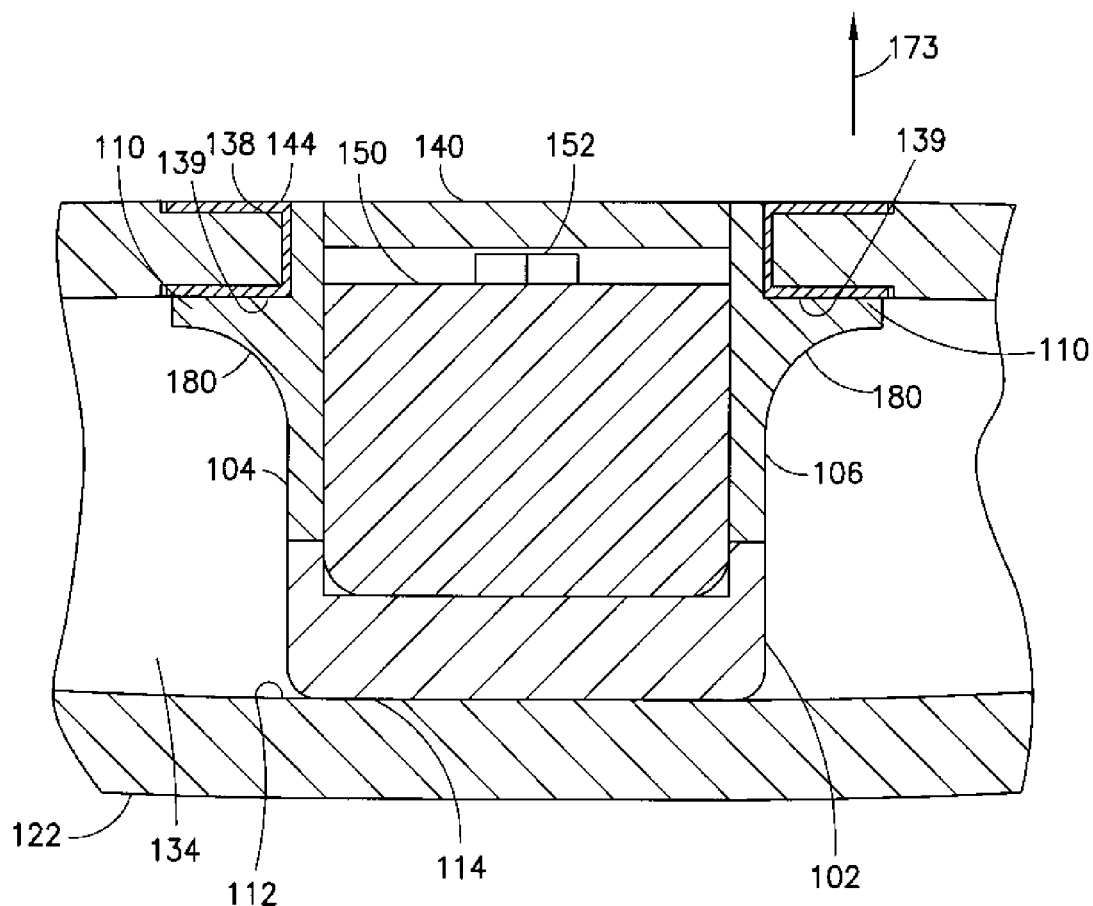
FIG. 8 is an illustration, in cross-sectional view taken along lines 8-8, of a rotor blade in which the enclosure is installed.

FIG. 5 is an illustration of an enclosure 100 in exploded view, depicting all the parts of the enclosure 100 depicted in FIGS. 1-4. FIGS. 6-8 depict the enclosure 100 installed within the rotor blade 122 in side view (FIG. 6), and in two cross-sectional views (FIGS. 7-8). The composition, assembly and installation of the enclosure 100 will now be described with respect to FIGS. 4-8.

The enclosure 100 comprises four main components: an upper element 102, an aft element 104, a forward element 106 and a lower element 140. As can be seen, upper element 102 has a cut-out portion to form a space 186 for accepting a payload. Forward element 106 and aft element 104 are both U-shaped, which serves to provide space for a payload when the enclosure 100 is in an assembled configuration. In an assembled configuration, as seen in FIG. 4, upper element 102 is in contact with both forward element 106 and aft element 104, and forward element 106 and aft element 104 are in contact with lower element 140, which acts like a cover for the enclosure 100.

Aft element 104 and forward element 106 both have flanges 124, 126. When aft element 104 and forward element 106 are in an installed configuration as shown in FIGS. 6-8, flanges 124 and 126 form a peripheral flange 110. This peripheral flange 110 helps to retain the enclosure 100 within the cavity 134 as described in more detail below.

In an installed configuration, the upper surface 114 of the upper element 102 is in contact with the internal surface 112 of the rotor blade 122. Forward element 106 and aft element 104 are in contact with the upper element 102. The peripheral flange 110 of the enclosure 100 is in contact with the peripheral edge 138 of the opening 136. A weight 150 or other payload is placed into the enclosure 100. Finally, the lower element 140 is coupled to the forward element 106, aft element 104, and upper element 102.

In an assembled configuration, the aft element 104 and the forward element 106 share an L-shaped interface line 178, which can best be seen in FIG. 6. This interface line 178 exists because aft element 104 and forward element 106 are not mirror images of each other. As can best be seen in FIG. 5, forward element 106 has an aft extension 148 which sits on a forward extension 146 on the aft element 104. This configuration allows sheer pins 156 to be inserted through sheer pin holes 162.

It should be noted that although this L-shaped interface is shown in the figures, other configurations may be possible. For example, a configuration in which the aft element 104 has a male extension which fits inside a female portion on the forward element 106 may also be possible. In such case, sheer pins 156 may be inserted through both the male extension and female portion. Additionally, the aft element 104 and forward element 106 may meet at a flat vertical interface surface, rather than an L-shaped surface or another type of surface. Sheer pins 156 are not strictly necessary for the design, but assist with ensuring that forward element 106 and aft element 104 are properly aligned while inserted in the rotor blade 122.

Alternatively, it is also possible that forward element 106 and aft element 104 are one single, unitized element, rather than two separate elements. In such a case, the single unitized element would be shaped as a combination of the forward and aft element, in other words, if the forward and aft elements were brought together and permanently attached.

A unitized element can be manufactured and provided to the cavity 134 in a number of different ways. For example, uncured composite layers configured to form a single unitized element having the shape of a combination of a forward element 106 and an aft element 104 together may be placed within the cavity 134 in the rotor blade 122 during or prior to manufacture of the rotor blade and subsequently cured within the rotor blade 122 such that a single cured unitized element is produced and is loose within the cavity. Any parts required for curing, such as vacuum bags and other parts may be withdrawn after cure.

Alternatively, if access to the inside of the rotor blade 122 is provided in a different manner, for example, through an alternate opening in a location such as an aft side of the rotor blade 122, then a unitized forward/aft element piece can be brought through such alternate opening and brought into engagement with the peripheral edge 138 of the opening 136. The alternate opening may be cut out of a wall in the cavity 134 specifically for the purpose of inserting the unitized element into the cavity 134. Alternatively, the alternate opening may be present for some other purpose. After the unitized element is provided into the cavity 134 through the alternate opening, the alternate opening may be closed.

The various parts may be held together with the use of fasteners, sheer pins, or through other methods. In the example of the enclosure 100 shown, sheer pins 156 are inserted through sheer pin holes 162 in the forward element 106, aft element 104, and upper element 102. Lower element 140 is held in place with the use of fasteners 154 inserted through fastener holes 164 in the forward element 106, aft element 104, upper element 102 and lower element 140. Weight 150 is held in place through the use of hex bolts 152, inserted through hex bolt holes 166 in weight 150 and upper element 102. Though this particular combination of fasteners is described and shown, other combinations or configurations of fasteners, or retention devices may be used. For example, an adhesive may be used instead of fasteners.

If a single unitized element is used, sheer pins may still be used to align the unitized element with respect to the upper element 102.

A reinforcement liner 144 may be present around the peripheral edge 138 to help bear forces exerted on and/or by the enclosure 100. Liner 144 is not affixed to the enclosure 100, but is used to line the peripheral edge 138 of the opening 136 in the rotor blade 122. The liner 144 may be a plurality of elements made out of composite materials, metal materials, or other appropriate materials. The dimensions of the main elements of the enclosure 100 are such that the upper surface 114 and peripheral flange 110 are snugly held between the peripheral edge 138 and internal surface 112 when the enclosure 100 is in an installed configuration. The enclosure 100 is therefore held firmly in place by the upper surface 114 of the upper element 102 and the peripheral flange 110 of the enclosure 100.

In prior art embodiments, holding payload enclosures in place is typically done with the use of adhesives, fasteners, or by being co-cured, or with a combination of such methods. With the enclosure 100 which is the subject of this disclosure, no such retention methods or devices are used. Rather, the specific geometry of the parts of the enclosure 100 cause the natural forces applied to the enclosure 100 when the rotor blade 122 is in operation to retain the enclosure 100 in place and prevent vibration or movement of the enclosure 100 relative to the rotor blade 122.

Different parts of the enclosure 100 possess angled surfaces which work together to provide this retention functionality. Specifically, both forward element 106 and aft element 104 possess a parting angle 160 which means that the forward element 106 and aft element 104 are thicker at one end than at the other. This parting angle 160 is best reflected in the fact that the bottom surfaces 168 of flanges 124, 126 are angled with respect to the upper surface 170 of forward element 106 and aft element 104. Further, upper element 102 has a parting angle 158 which runs in an opposite direction to the parting angle 160 in the forward element 106 and aft element 104. The parting angle 158 of the upper element 102 is best reflected in the fact that the upper surface 114 of upper element 102 is angled with respect to the lower surface 172 of the upper element 102.

The parting angles 160, 158 assist with retaining the enclosure 100 in place and with resisting and relative motion of the parts of the enclosure 100 with respect to each other and with respect to the rest of the rotor 122. They do this by harnessing a natural force which is applied to a rotor 122 during operation, which is the centrifugal force. The centrifugal force is exerted in an outboard direction 174 on all parts of the enclosure 100. This of course includes forward element 106, aft element 104, and upper element 102. With centrifugal forces applied to forward element 106 and aft element 104 in an outboard direction, rim 176 of forward element 106 and aft element 104 contacts the peripheral edge 138 (or liner 144 if present), which prevents further outboard motion of both forward element 106 and aft element 104. With centrifugal force applied to upper element 102, the parting angles 158, 160 cause the upper element 102 to act like a wedge and resist further movement outboard.

Note that although parting angles 158 and 160 are depicted as being complementary on upper element 102 and forward element 106 and aft element 104, it should be understood that parting angles 158 and 160 may be configured differently. For example, parting angle 160 may be zero or may be different from what is shown in FIG. 5. It should be understood however that parting angle 158 should be such that centrifugal forces applied to the enclosure 100 force the upper element 102 to wedge against the rest of the enclosure (forward element 106 and aft element 104). It should also be understood that although parting angles 158 and 160 are reflected in angles between specific surfaces (upper surface 114 and lower surface 172, for example), the parting angles 158 and 160 may be between any surfaces that provide the required functionality of allowing upper element 102 to be wedged into place by centrifugal forces. It should also be understood that the contour of the interior of the blade 122 may have angled surfaces and may contribute to the required amount of angle present in the parting angles 158 and 160.

The wedging of upper element 102 also forces forward element 106 and aft element 104 in a downward direction 173, which causes flange 110 to press against peripheral edge 138 (or liner 144 if present), preventing forward and aft elements 104, 106 from falling out of the rotor blade 122, and preventing forward and aft elements 104, 106 from falling into the rotor blade 122. It can therefore be seen that the parting angles 158, 160 and other geometry of the parts of the enclosure 100 cause the enclosure 100 to be held firmly in place when the rotor 122 is in operation, without the requirement for the use of structures such as fasteners, adhesives, or a co-cured bond between the rotor blade 122 and the enclosure 100. It should be noted that fasteners may be used within the enclosure 100, but benefit is still obtained by foregoing the use of fasteners to join enclosure 100 to rotor blade 122. The parting angles 158, 160 also function to prevent the parts of the enclosure 100 from being thrown from the blade in flight if the sheer pins 156 fail.

The design of the enclosure 100 is such that a robust load path is provided for forces acting on the enclosure during normal operation of the rotor. Such forces include upward and downward forces caused by rotor blade 122 movement up and down, outboard directed forces, caused by the centrifugal force, as well as forward and aft directed forces, caused by movement of the rotor blade 122.

Motion of the rotor blade 122 in a downward direction causes a force to be applied by the internal surface 112 of the rotor blade 122 to the upper surface 114 of the upper element 102. This force is generally applied to the entire upper surface 114 of the upper element 102 by a corresponding area on the internal surface 112 of the rotor blade 122. There are no small or weak components that bear these forces. Motion of the rotor blade 122 in an upward direction causes a force to be applied by the peripheral edge 138 (through liner 144 if present) to the flange 110. The flange 110 is supported by reinforcement area 180 (a fillet) around the entirety of the periphery of the flange. It should be noted that although a fillet is shown, gussets could be used as well as other features which provide reinforcement functionality. Forces applied to the rim 176 in forward and aft directions are borne by the rim 176 and the peripheral edge 138 along the periphery of the rim 176 and peripheral edge 138. Reinforcement liner 144 assists in bearing forces applied to the peripheral edge 138. The curve in the rim 176 helps to distribute the forces by not presenting any corners at which forces would concentrate. It should be noted that although the rim 176 has a curved shape, other shapes are possible, such as square or rectangular, or a square with slightly rounded edges, or other shapes.

It is beneficial if payload, such as weighting element 150 possesses a peripheral wall 182 which fits snugly into the compartment 184 formed in the enclosure 100, such that peripheral wall 182 is against walls of the compartment 184, allowing the walls of the compartment to bear the forces applied by the payload.

Figure 9:
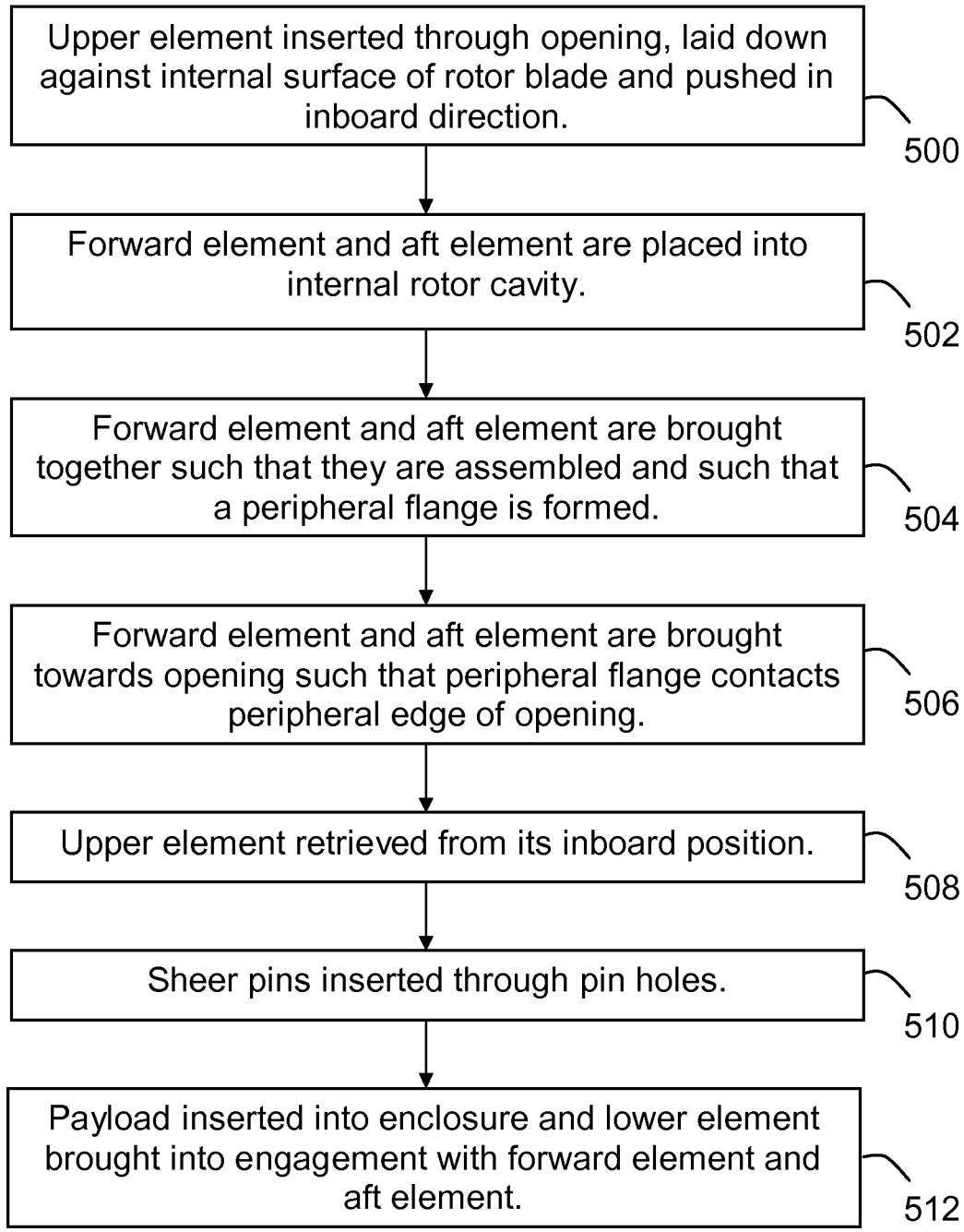
FIG. 9 is an illustration of a sequence of steps for installing an enclosure into a rotor blade.

FIG. 9 is an illustration of a sequence of steps of assembling an enclosure 100 within a cavity 134 of a rotor blade 122. It should be understood that this is an example method and that other methods consistent with the teachings provided herein are possible. This method assumes that a liner 144 is already installed in the rotor blade 122. In step 500, the upper element 102 is inserted through the opening 136 and laid down against the internal surface 112 of the rotor blade 122. The upper element 102 is preferably pushed in an inboard direction to make room for the other components. In step 502, the forward element 106 and aft element 104 are placed into the internal rotor cavity 134. It is preferable to orient the forward element 106 and aft element 104 with their corresponding flanges 124, 126 pointing away from each other such that the forward element 106 and aft element 104 may be easily brought together.

In step 504 the forward element 106 and aft element 104 are brought together such that their corresponding mating surfaces—aft element mating surface 120 on the forward element 106 and forward element mating surface 118—are brought together, thereby assembling the forward element 106 and aft element 104 within the rotor cavity 134, and such that the peripheral flange 110 is formed by the two corresponding flange surfaces 124 and 126. A pin, clip or other temporary fastening device may be used to hold the forward element 106 and aft element 104 in place for the subsequent steps. Alternatively, first the forward element 106 may first be placed into the cavity 134 and brought into engagement with the peripheral edge 138, then the aft element 104 may be placed into the cavity 134 and brought into engagement with the forward element 106 and the peripheral edge 138.

In step 506, the forward element 106 and aft element 104 are brought towards the opening 136 such that the peripheral flange 110 contacts the peripheral edge 138 of the opening 136. In step 508, the upper element 102 is retrieved from its inboard position and brought into contact with the forward element 106 and aft element 104. A retrieval device may be used to grip the upper element 102 so that it may be brought into place. The upper element 102 is slid outboard such that the upper surfaces 170 of forward element 106 and aft element 104 are brought into contact with the lower surface 172 of upper element 102. The upper element 102 is slid until it is properly aligned with forward element 106 and aft element 104.

In step 510, sheer pins 156 are inserted through sheer pin holes 162 to align the forward element 106, aft element 104, and upper element 102. In step 512, a payload such as weight 150 is inserted into the enclosure 100, and fasteners such as hex nuts 152 are inserted into hex nut holes 166 to secure weight 150 in place.

Finally, the lower element 140 is brought into engagement with the forward element 106 and aft element 104, and fasteners 154 are inserted through holes 164 to secure the entire enclosure 100 in an assembled configuration. The enclosure 100 is now assembled.

The enclosure 100 may be removed from within the rotor blade 122 through a procedure which is the reverse of what is disclosed above with respect to FIG. 5. Fasteners 154 are removed. The lower element 140 is removed from the rest of the enclosure 100. Hex nuts are removed. Weight 150 is removed. Sheer pins 156 are removed. The upper element 102 is slid in an inboard direction, to disengage it from the forward element 106 and aft element 104. Once fully disengaged, the forward element 106 and the aft element 104 are pushed into the rotor cavity 134 so that they may be separated from each other. The forward element 106 and aft element 104 are removed from the rotor cavity 134 through the opening 136. Finally, the upper element 102 is removed through the opening 136.

Thus it can be seen that the enclosure 100 can be easily installed and removed, while the enclosure 100 is lodged firmly in place during operation of the rotor blade 122.

In any of the foregoing embodiments, additional structural or support elements may be used as needed. For example, a liquid shim layer may be used to fill spaces that exist. Additionally, further layers of enforcement similar to the lining 144 may be installed in various locations.

While the disclosure has been described with reference to various embodiments, it will be understood by those skilled in the art that various changes may be made and equivalents may be substituted for elements thereof without departing from the scope of the disclosure. In addition, many modifications may be made to adapt a particular situation to the teachings of the disclosure without departing from the essential scope thereof. Therefore it is intended that the disclosure not be limited to the particular embodiment disclosed herein contemplated for carrying out the methods of this disclosure, but that the disclosure will include configurations, modifications or combinations falling within the scope of the appended claims.

We claim:

1. An enclosure comprising:
 a first element having a first flange; and
 an upper element;
 said first element having an upper surface which has a first angle with respect to a lower surface of said first flange in a direction extending from an inboard direction to an outboard direction;
 said upper element having a lower surface which has a second angle with respect to an upper surface of said upper element in a direction extending from an inboard direction to an outboard direction, said lower surface being in contact with said upper surface of said first element, said second angle being in a direction which is opposite to the direction of said first angle; and
 said first element and said upper element defining a cavity.

2. The enclosure of claim 1, wherein:
 said first element is a unitized forward and aft element; and
 said first flange is a peripheral flange.

3. The enclosure of claim 1,
 wherein said first element comprises a forward element with a forward flange and an aft element with an aft flange; and
 said forward flange and said aft flange being substantially aligned to define said first flange of said first element.

4. The enclosure of claim 3, wherein:
 said aft element and said forward element have upper surfaces aligned to form said upper surface of said first element; and
 said lower surface of said upper element being in contact with said upper surfaces of said aft element and said forward element.

5. The enclosure of claim 3, further comprising:
 a lower element coupled to said aft element and said forward element, enclosing said cavity.

6. The enclosure of claim 1, further comprising:
 a payload inserted within said cavity.

7. The enclosure of claim 3, wherein:
 said forward flange and said aft flange forming a reinforcement area above the forward flange and aft flange, for providing reinforcement to said first flange.

8. The enclosure of claim 3, wherein:
 said aft element and said forward element are U-shaped to provide space for a payload.

9. The enclosure of claim 1, wherein:
 said upper element has a cut-out portion to form a space for accepting a payload.

10. A combination apparatus comprising:
 a rotor blade comprising an opening with a peripheral edge;
 an enclosure being inserted into said rotor blade, said enclosure comprising:
 a first element having a first flange; and
 an upper element comprising an upper surface mating with an interior surface of said rotor blade;
 said first element having an upper surface which has a first angle with respect to a lower surface of said first flange in a direction extending from an inboard direction to an outboard direction;
 said upper element having a lower surface which has a second angle with respect to an upper surface of said upper element in a direction extending from an inboard direction to an outboard direction, said lower surface being in contact with said upper surface of said first element, said second angle being in a direction which is opposite to the direction of said first angle;
 said first element and said upper element being in contact and defining a cavity; and
 said first flange being in engagement with the peripheral edge.

11. The enclosure of claim 10, wherein:
 said first element is a unitized forward and aft element; and
 said first flange is a peripheral flange.

12. The enclosure of claim 10,
 wherein said first element comprises a forward element with a forward flange and an aft element with an aft flange; and
 said forward flange and said aft flange being substantially aligned to define said first flange of said first element.

13. The combination of claim 12, wherein:
said aft element and said forward element have upper surfaces aligned to form said upper surface of said first element; and
said lower surface of said upper element being in contact with said upper surfaces of said aft element and said forward element.

14. The combination of claim 10, further comprising:
a lower element coupled to said first element, enclosing said cavity.

15. The combination of claim 10, further comprising:
a payload inserted within said cavity.

16. The combination of claim 10, further comprising:
said first flange forming a reinforcement area above said first flange, to reinforce said first flange.

17. The combination of claim 13, wherein:
said aft element and said forward element are U-shaped to provide space for a payload.

18. A method for installing an apparatus into a cavity in a rotor blade comprising the steps of:
inserting, into said cavity, an upper element comprising an upper surface for mating with an interior surface of said rotor blade, and sliding said upper element in an inboard direction to a stowed position;
inserting, into said cavity, a first element having a first flange;
moving said first element such that said flange is in contact with a peripheral edge in an opening in said rotor blade; and
retrieving said upper element from said stowed position by moving said upper element in an outboard direction, wherein an angled lower surface of said upper element contacts an angled upper surface of said first element, until a second cavity is formed by the upper element and the first element.

19. The method of claim 18, wherein:
said upper element and said first element are inserted through said opening.

20. The method of claim 19, wherein said first element comprises a forward element with a forward flange and an aft element with an aft flange, the method further comprising:
inserting, into said cavity, said aft element and said forward element; and
moving said aft element and said forward element in a downward direction towards said opening until a peripheral edge of said opening is brought into contact with said aft flange and said forward flange, said aft flange and said forward flange together forming said first flange of said first element.

21. The method of claim 20, wherein:
prior to moving said aft element and said forward element in a downward direction, bringing said aft element and forward element together such that said aft flange and said forward flange are substantially aligned to form said first flange of said first element.

22. The method of claim 18, further comprising:
creating an alternate opening for insertion of said first element;
wherein said first element is a unitized forward and aft element; and
wherein inserting, into said cavity, a first element having a first flange comprises inserting said unitized element through said alternate opening.

23. The method of claim 18,
wherein said first element is inserted into the cavity in the rotor blade prior to manufacture of the rotor blade.

24. The method of claim 22, further comprising:
closing said alternate opening.

25. The method of claim 18, further comprising:
placing a liner along the peripheral edge of the opening of the rotor blade.

\* \* \* \* \*